No. 627,534. Patented June 27, 1899.
H. I. SCHENCK.
POTATO DIGGER.
(Application filed Oct. 1, 1898.)
(No Model.)

Witnesses:
Jas. F. Coleman
Jno. R. Taylor

Inventor
Henry I. Schenck
by Rich. T. Dyer
Atty.

UNITED STATES PATENT OFFICE.

HENRY I. SCHENCK, OF HOLMDEL, NEW JERSEY.

POTATO-DIGGER.

SPECIFICATION forming part of Letters Patent No. 627,534, dated June 27, 1899.

Application filed October 1, 1898. Serial No. 692,367. (No model.)

*To all whom it may concern:*

Be it known that I, HENRY I. SCHENCK, a citizen of the United States, residing at Holmdel, in the county of Monmouth, in the State of New Jersey, have invented certain new and useful Improvements in Potato-Diggers, of which the following is a specification.

My invention relates to new and useful improvements in potato-diggers, and the specific type of such implements to which the invention particularly relates is that employing a substantially flat plow or shovel adapted to work into the hills and provided with a rearwardly-extending screen formed integral therewith, means being provided for rapidly vibrating the screen and shovel for the purpose of freeing the potatoes from the dirt.

The present improvements relate to specific details in potato-diggers of this type, by which their operations will be facilitated.

In order that my invention may be better understood, attention is directed to the accompanying drawings, forming part of this specification, in which—

Figure 1:
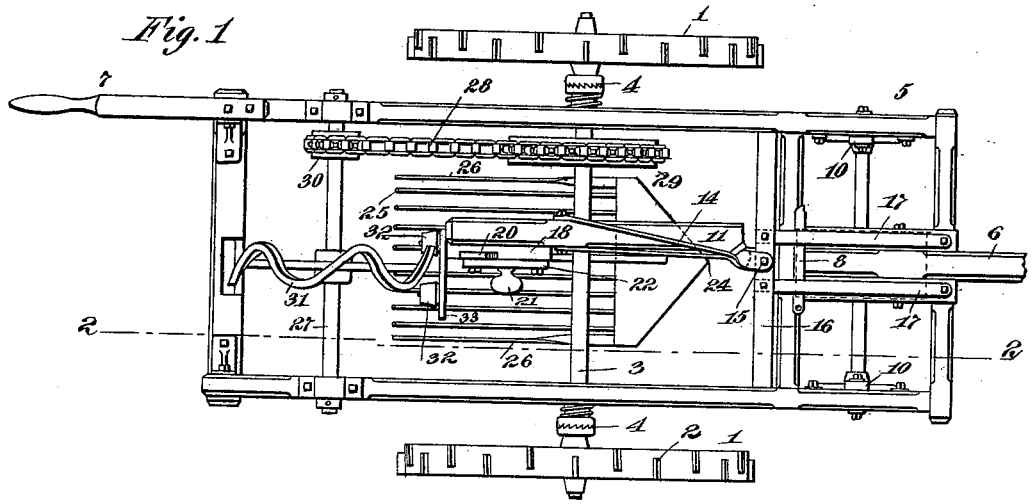
Figure 2:
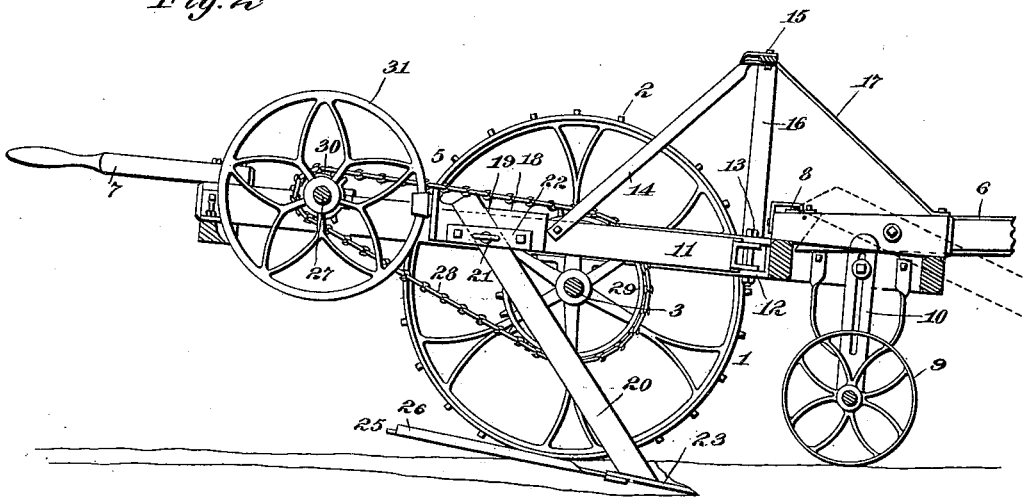

Figure 1 is a plan view; Fig. 2, a section taken on line 2 2 of Fig. 1, and Fig. 3 a detail view of the antifriction-rollers.

In all of the above views corresponding parts are represented by the same numerals of reference.

1 1 are the supporting-wheels, the tires of which are preferably provided with the ordinary lugs or projections 2 to prevent slipping. The wheels 1 1 are preferably loosely mounted on the axle 3, but in rotating they are adapted to drive said axle through the two clutches 4 4 of any suitable type. The use of these clutches thus interposed between the supporting-wheels and the driven axle facilitates the turning of the implement, as is common in this art. Mounted on the axle 3 is a framework 5 of a generally rectangular form, as shown. Pivoted to the frame 5, at its forward end, is a tongue 6, to which the horses are hitched. At the rear of the frame is an operating-handle 7, by which the inclination of the framework may be changed to vary the depth of cut, as will be explained, this adjustment of the frame being allowed by reason of the pivot connection with the tongue. When the device is out of use, the frame is tilted so that the rear end of the tongue may be engaged above a latch 8, as shown in dotted lines in Fig. 2, so as to elevate the shovel entirely clear of the ground.

At the front of the frame is a single furrow-wheel 9, the shaft of which is carried by the adjustable brackets 10, secured to the side frames and by which the depth of cut may be varied. Each of these brackets 10 may be suitably braced by the usual arched brace, as shown in Figs. 1 and 2 and as is common in agricultural implements.

11 is a vibrating beam, which carries the shovel, said beam being pivoted at its forward end in the bracket 12 on a vertical pivot-bolt 13. The rear end of the vibrating beam is sustained by a brace 14, which is pivoted at 15 to a frame 16, the pivot 15 being in line with the pivot 13, so as to allow of free movement of the vibrating beam. The frame 16 may, if desired, be strengthened by braces 17 extending between the same and the framework 5 of the digger. On the rear end of the vibrating beam is a casting 18, having an inclined slot 19 therein. Mounted in said slot is an arm 20, held in any desired position by means of a thumb-screw 21 working in a bridge 22, which extends across the slot 19, as shown. The lower end of the arm 20 carries the plow or shovel 23, having a pointed front edge 24 and made approximately flat, as shown. This plow or shovel carries a screening device, which in this instance comprises a series of rearwardly-extending rods 25, arranged sufficiently close together as to prevent the potatoes from falling between the same, but of a sufficient distance apart as to allow of the ready passage of dirt sifted from the potatoes. At the outside of the rods 25 are two approximately vertical plates 26, which constitute sides for the sifter and prevent the escape of the potatoes sidewise, causing them to be deposited in the path of the machine and directly over the original hills.

Figure 3:
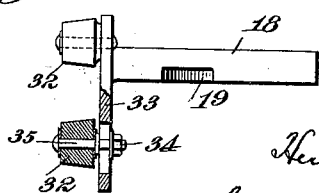

Mounted in the framework 5 of the implement is a counter-shaft 27, which is driven from the main axle preferably by means of a sprocket-chain 28, working over sprocket-wheels 29 and 30. The counter-shaft 27 is preferably driven at a very much higher rate of speed than the axle 3. Keyed to the counter-shaft 27 is a cam-wheel 31, preferably skeletoned for the purpose of lightness and having a sinuous or wave-like periphery, as shown. This cam-wheel engages between two antifriction-rollers 32 32, carried on an arm 33, preferably cast integral with the casting 18. One of the antifriction-rollers 32 is made, preferably, adjustable in the arm 33—as, for example, by being mounted in a slot in said arm, as shown in Fig. 3, being held in its position by means of a nut 34 on a shaft 35, on which said roller is mounted.

The operation of my improved potato-digger is as follows: The furrow-wheel 9 is adjusted so as to give the required depth of cut to the shovel 23, causing said shovel to engage the hills immediately beneath the line of the potatoes. The implement being drawn parallel to the hills, the rotation of the main supporting-wheels, which operates the shaft through ratchet-clutches 4, causes the counter-shaft 27 to be rotated at a much higher speed. The rotation of the cam-wheel 31 produces a rapid vibration of the arm 11 by the engagement between the wave-like or sinuous periphery thereof and the antifriction-rollers 32, and this shaking of the screen causes any dirt which may have been carried with the potatoes up on the screen by the forward movement of the implement to be shaken out, the potatoes being deposited behind the screen and in the line of the hills.

The entire device is simple in its construction, and all the moving parts are sufficiently elevated above the ground so as not to become clogged with dirt resulting from the operation.

Having thus described my invention, what I claim as new, and desire to secure by Letters Patent, is as follows:

1. In an improved potato-digger of the type described, the combination with the main frame and the supporting-wheels thereof, of a pivoted vibrating arm mounted in said frame, a shovel carried by said arm at its lower end, a standard 16 carried by the main frame, and a brace-rod pivoted in line with the pivot of the vibrating arm and connected at its lower end to said vibrating arm, substantially as set forth.

2. In an improved potato-digger of the type described, the combination with the main frame, axle and supporting-wheels, of a vibrating arm mounted in the frame and carrying a shovel, a counter-shaft mounted in the frame, connection between said counter-shaft and the main axle, a cam-wheel having a sinuous or wave-like periphery carried by said counter-shaft, and connection between said cam-wheel and vibrating arm, substantially as set forth.

3. In an improved potato-digger of the type described, the combination with the main frame, axle and supporting-wheels, of a vibrating arm mounted in the frame and carrying a shovel, a counter-shaft mounted in the frame, connection between said counter-shaft and the main axle, a cam-wheel having a sinuous or wave-like periphery carried by said counter-shaft, and antifriction-rollers on the vibrating arm engaging said cam-wheel, substantially as set forth.

4. In an improved potato-digger of the type described, the combination with the main frame, axle and supporting-wheels, of a vibrating arm mounted in the frame and carrying a shovel, a counter-shaft mounted in the frame, connection between said counter-shaft and the main axle, a cam-wheel having a sinuous or wave-like periphery carried by said counter-shaft, antifriction-rollers on the vibrating arm engaging said cam-wheel, and means for adjusting one of said rollers, substantially as set forth.

5. In a potato-digger of the type described, the combination with the main frame and supporting-wheels, of a vibrating arm mounted in said frame, means for vibrating said arm, an arm 20 adjustably carried by the vibrating arm, and a plow mounted at the lower end of the arm 20, substantially as set forth.

6. In a potato-digger of the character described, the combination with the main frame and supporting-wheels, of a vibrating arm carried by the said frame, means for vibrating said arm, a plow or shovel carried by the vibrating arm, a series of rearwardly-extending sifter-rods carried by said shovel, and the plates 26 at the sides of said sifter-rods for the purpose described, substantially as set forth.

This specification signed and witnessed this 15th day of September, 1898.

HENRY I. SCHENCK.

Witnesses:
   CHAS. H. BUTCHER,
   AARON E. JOHNSTON.